Jan 6, 1931.     R. E. MILLER     1,787,587
COMBINATION POT AND POT COVER RACK
Filed March 2, 1928
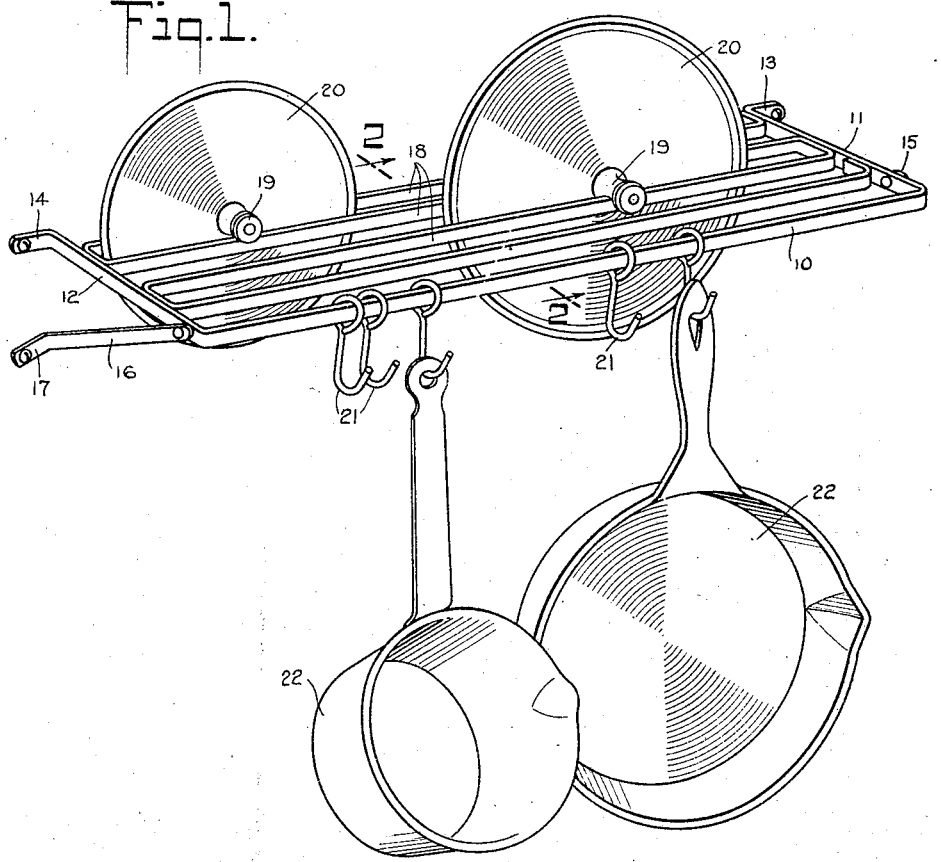
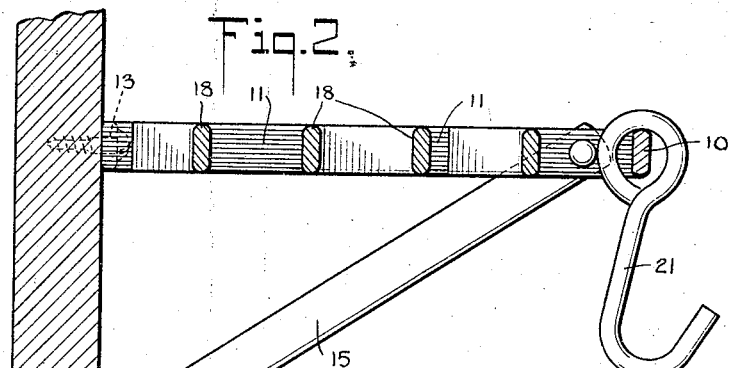
INVENTOR
Robert E. Miller
BY
ATTORNEY Patented Jan. 6, 1931

1,787,587

UNITED STATES PATENT OFFICE

ROBERT E. MILLER, OF BRONXVILLE, NEW YORK

COMBINATION POT AND POT-COVER RACK

Application filed March 2, 1928. Serial No. 258,462.

My present invention relates generally to supports, and has particular reference to a supporting device or rack for the combined accommodation of pots or the like and pot-covers.

It is a primary object of my invention to provide a simple, attractive, yet efficient rack which may be attached to any suitable supporting wall, presumably in a kitchen, for the removable accommodation and suspension of pot-covers and pots.

One feature of my invention lies in providing a set of spaced rungs or the like, the spacing and relative arrangement thereof being such that the set of pot-covers may be retained in supported yet removable and accessible positions in the spaces between said rungs.

It is another feature of my invention to provide a construction wherein such rungs are constituted, at least partially, of an integral strip of material such as copper, steel, or the like, said strip being merely doubled and redoubled upon itself in zigzag fashion to provide the rungs mentioned.

Another feature of my invention lies in providing the rack in such a manner that the end rung thereof constitutes at one time a means for retaining the entire rack in supported and assembled condition, and an instrumentality for efficiency providing for the removable suspension of pots in a most efficient manner.

More particularly, it is a feature of my invention to provide a substantially U-shaped strip, whereof the arms provide spaced supports for the majority of the rungs, and whereof the base constitutes the end rung referred to, said end rung being provided with a set of relatively adjustable hooks. In a preferred construction, the arms of the U-shaped strip are provided with means for affixing the entire rack to a supporting wall or the like.

In general, it is an object of my invention to provide a rack of the character mentioned which will efficiently provide for the independent and mutually uninterfering support of both pots and pot-covers; the entire rack being of such a construction as to render its manufacture simple and inexpensive and its mode of attachment and use expeditious and hence highly desirable.

For the attainment of the foregoing objects and such other objects as may hereinafter appear or be pointed out, I have constructed a rack embodying the features of my invention and illustrated in the accompanying drawings wherein—

Figure 1 is a perspective view of the rack as it appears when in use; and

Figure 2 is a cross-sectional view upon a greatly enlarged scale taken substantially along the line 2—2 of Figure 1.

The rack illustrated for the purpose of explaining the nature of my invention comprises a U-shaped strip of suitable material having a substantially straight base 10 and two integral end extensions 11 and 12, the latter constituting substantially parallel arms of the U and provided at their ends with the end portions 13 and 14, the latter being designed for attachment to a suitable supporting wall. A set of braces 15 and 16 extend from the forward portions of the extensions 11 and 12 to rearwardly arranged ends 17 similarly designed for attachment to the supporting wall. The illustrated construction and arrangement provides suitable means for supporting the U-shaped strip in a substantially horizontal plane.

Extending between the arms 11 and 12 I provide a set of spaced and substantially parallel rungs 18. In accordance with one feature of my invention these rungs are constituted of an integral strip of material similar to that forming the U-shaped strip mentioned above, said integral strip being doubled and redoubled upon itself in zigzag fashion between the arms 11 and 12. The latter thereby provides supports, as by welding or the like, for the ends of the rungs 18, and the entire construction is thereby rendered extremely simple in nature and hence inexpensive from a manufacturing standpoint.

The rungs 18 are so spaced as to accommodate pot-covers in an endwise manner therein as shown in Figure 1. More particularly, the rungs are spaced (a) sufficiently apart to provide recesses therebetween through which the pot-covers may be received in an endwise manner, yet (b) sufficiently close so as to prevent the midportion of the pot-covers to pass therethrough. That is, the handles 19 of the pot-covers 20 find support upon the adjacent rungs 18 during the endwise application of the pot-covers into the recesses between the rungs 18. In this way, a set of pot-covers 20 may be efficiently supported in a variety of ways, being retained in such supported, yet readily removable and accessible, positions.

To provide for the simultaneous efficient suspension of pots, I arrange a series of hooks 21 loosely and hence relatively adjustable upon the end or forward rung constituted of the base 10. It will be noted that each hook is provided with a looped rear end extending loosely about the rung 10 and hence permitting the hook to be adjusted along the rung 10 into suitable and desired position, depending upon the pot or pots being supported.

The fact that the pots have relatively wide bodies 22 necessitates their suspension at a point spaced from the supporting wall. The fact that the rack is also to serve as a suitable support for the pot-covers increases the necessity for providing means for preventing mutual interference between the supported pot-covers and the suspended pots. For these reasons, it is a particular feature of my invention to provide the hooks 21 upon the end or foremost rung 10, thereby permitting the pots to hang as shown in Figure 1, out of interfering relationship with the supported pot-covers 20 and with the supporting wall. Furthermore, it will be noted that the U-shaped strip serves a number of purposes. The base thereof serves as one of the rungs which define the recesses between which the pot-covers are accommodated; the same base of the U provides means for suspending the pots in an efficient manner; the arms 11 and 12 of the U serve as end supports for the other rungs; and the arms 11 and 12 serve also as important supporting elements for the entire device.

It will be obvious that changes in the details herein described and illustrated for the purpose of explaining the nature of my invention may be made by those skilled in the art without departing from the spirit and scope of the invention as expressed in the appended claim. It is therefore intended that these details be interpreted as illustrative, and not in a limiting sense.

Having thus described my invention and illustrated its use, what I claim as new and desire to secure by Letters Patent is—

A combination pot and pot-cover rack, comprising a substantially U-shaped strip of flat metal bent at its ends to provide flanges extending outwardly from the free ends of the legs of the U whereby the rack can be affixed to a supporting wall by means of said flanges, an integral strip of flat metal doubled and redoubled upon itself to form a plurality of spaced rungs in parallelism, portions for connecting the adjacent rungs and end flanges, said integral strip being received between and within the legs of the U with the connecting portions and the end flanges in contact with and affixed to the legs of the U whereby the connecting web of the U-shaped strip forms the end or outer rung and all the rungs are positioned in the same horizontal plane.

In witness whereof I have signed this specification this 28 day of February, 1928.

ROBERT E. MILLER.